(12) United States Patent
Zalevsky et al.

(10) Patent No.: US 7,646,549 B2
(45) Date of Patent: Jan. 12, 2010

(54) IMAGING SYSTEM AND METHOD FOR PROVIDING EXTENDED DEPTH OF FOCUS, RANGE EXTRACTION AND SUPER RESOLVED IMAGING

(75) Inventors: Zeev Zalevsky, Rosh Haayin (IL); Alex Zlotnik, Ashdod (IL)

(73) Assignee: Xceed Imaging Ltd, Rosh Haayin (IL)

( * ) Notice: Subject to any disclaimer, the term of this patent is extended or adjusted under 35 U.S.C. 154(b) by 183 days.

(21) Appl. No.: 11/959,256

(22) Filed: Dec. 18, 2007

(65) Prior Publication Data

US 2008/0151391 A1    Jun. 26, 2008

Related U.S. Application Data

(60) Provisional application No. 60/875,393, filed on Dec. 18, 2006.

(51) Int. Cl.
G02B 9/00 (2006.01)
H01L 21/326 (2006.01)

(52) U.S. Cl. .................. 359/738; 359/558; 359/559; 359/739; 359/740; 359/721; 438/468; 438/535; 438/508

(58) Field of Classification Search .......... 359/558, 359/559, 739, 721, 740; 438/468, 535, 508
See application file for complete search history.

(56) References Cited

U.S. PATENT DOCUMENTS

| | | | | |
|---|---|---|---|---|
| 4,873,653 A | * | 10/1989 | Grosskopf | 359/371 |
| 6,239,909 B1 | * | 5/2001 | Hayashi et al. | 359/569 |
| 6,525,302 B2 | * | 2/2003 | Dowski et al. | 382/214 |
| 7,336,430 B2 | * | 2/2008 | George et al. | 359/708 |

2006/0034003 A1    2/2006    Zalevsky

FOREIGN PATENT DOCUMENTS

WO    2004102958 A1    11/2004

OTHER PUBLICATIONS

D. Sazbon et al., "Qualitative real-time range extraction for preplanned scene partitioning using laser beam coding", Pattern Recognition Letters 26:1772-1781 (2005).

(Continued)

*Primary Examiner*—Evelyn A. Lester
(74) *Attorney, Agent, or Firm*—Browdy and Neimark, PLLC

(57) ABSTRACT

An imaging system is presented for imaging objects within a field of view of the system. The imaging system comprises an imaging lens arrangement, a light detector unit at a certain distance from the imaging lens arrangement, and a control unit connectable to the output of the detection unit. The imaging lens arrangement comprises an imaging lens and an optical element located in the vicinity of the lens aperture, said optical element introducing aperture coding by an array of regions differently affecting a phase of light incident thereon which are randomly distributed within the lens aperture, thereby generating an axially-dependent randomized phase distribution in the Optical Transfer Function (OTF) of the imaging system resulting in an extended depth of focus of the imaging system. The control unit is configured to decode the sampled output of the detection unit by using the random aperture coding to thereby extract 3D information of the objects in the field of view of the light detector unit.

16 Claims, 18 Drawing Sheets

OTHER PUBLICATIONS

Z. Zalevsky et al., "Optical Systems with Improved Resolving Power", Progress in Optics, vol. XL, Chapter 4, pp. 275-341, 1999.

E. Ben-Eliezer et al., "All-optical extended depth of field imaging system", J. Opt. A: Pure Appl. Opt. 5 (2003) S1-S6.

J. Ojeda-Castaneda et al., "Super-Gaussian rings: focusing properties", Opt. Commun. 114 (1995) 189-193. Abstract only.

E. R. Dowski et al., "Extended depth of field through wave-front coding", Applied Optics 34(11) 875-877, Apr. 10, 1995.

J. Van Der Gracht et al., "Broadband behavior of an optical-digital focus-invariant system", Optics Letters 21(13) 919-921, Jul. 1, 1996.

W. Chi et al., "Electronic imaging using a logarithmic asphere", Optics Letters 26(12) 875-877, Jun. 15, 2001.

J. Ojeda-Castaneda et al., "Arbitrarily high focal depth with a quasioptimum real and positive transmittance apodizer", Applied Optics 28(13) 2666-2669, Jul. 1, 1989.

Y. G. Leclerc et al., "The direct computation of height from shading", Computer Vision and Pattern Recognition, pp. 552-558, 1991. Abstract only.

R. Zhang et al., "Shape from Intensity Gradient", IEEE Transactions on Systems, Man, and Cybernetics-Part A: Systems and Humans, 29(3) 318-325, May 1999.

Berthold K.P. Horn, "Height and gradient from shading", IJCV 5 (1990) 37-76.

M. Asada et al., "Determining of surface properties by projecting a stripe pattern", IEEE Proc. of ICPR, 86,1162-1164, 1986.

M. Asada et al., "Determining Surface Orientation by Projecting a Stripe Pattern", IEEE Transact. on Pattern Analysis and Machine Intelligence, 10(5), 749-754, Sep. 1988.

L. Zhang et al., "Rapid Shape Acquisition Using Color Structured Light and Multi-pass Dynamic Programming", Proc. of the First International Symposium on 3D Data Processing Visualization and Transmission, (IEEE Computer Society), Jul. 2002.

P. J. Besl, "Active, Optical Range Imaging Sensors", Machine Vision and Applications (1988) 1:127-152.

E. Horn et al., "Toward Optimal Structured Light Patterns", Proc. Int. Conference on Recent Advances in 3-D Digital Imaging and Modeling, pp. 28-37, Ottawa, Canada, May 1997.

W. Lukosz, "Optical Systems with Resolving Powers Exceeding the Classical Limit", J. Opt. Soc. Am. 56 (11):1463-1472, Nov. 1966.

Z. Zalevsky et al., "All-optical axial super resolving imaging using a low-frequency binary-phase mask", Opt. Exp. 14:2631-2643 (2006).

W. Gartner et al., "Ein experiment zur uberschreitung der abbeschen auglosungsgrenze", Zeitschrift fur Physik A Hadrons and Nuclei, 174(1): Mar. 18-23, 1963.

* cited by examiner

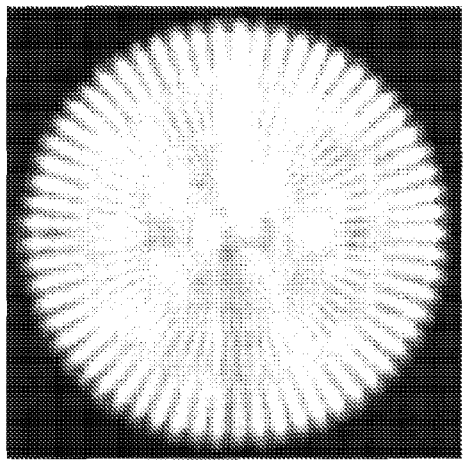 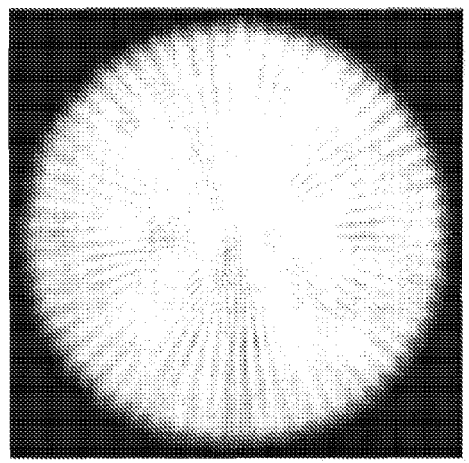
Fig. 8c					Fig. 8f
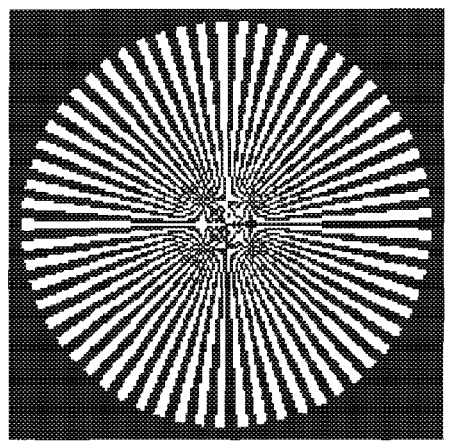
Fig. 8g

IMAGING SYSTEM AND METHOD FOR PROVIDING EXTENDED DEPTH OF FOCUS, RANGE EXTRACTION AND SUPER RESOLVED IMAGING

This nonprovisional application claims the benefit of U.S. Provisional Application No. 60/875,393, filed Dec. 18, 2006.

FIELD OF THE INVENTION

The present invention is generally in the field of imaging techniques and relates to an imaging system and method capable of providing extended depth of focus, range extraction and super resolved imaging.

REFERENCES

The following references are considered to be relevant to the background of the invention:

1. D. Sazbon, Z. Zalevsky and E. Rivlin, "Qualitative real-time range extraction for preplanned scene partitioning using laser beam coding," Pat. Rec. Lett., 26, 1772-1781 (2005).
2. Z. Zalevsky D. Mendlovic and A. w. Lohmann, Progress in optics, Vol. XL, Ch. 4 (1999).
3. Z. Zalevsky and D. Mendlovic "Optical Super Resolution," Springer (2002).
4. E. Ben-Eliezer, Z. Zalevsky, E. Marom and N. Konforti, "All-optical extended depth of field imaging system," J. Opt. A: Pure Appl. Opt. 5, S164-S169 (2003).
5. J. Ojeda-Castaneda, J. C. Escalera and M. J. Yzuel, "Super-Gaussian rings: focusing propeites," Opt. Commun. 114,189-193 (1995).
6. E. R Dowski and W. T. Cathey, "Extended depth of field through wave-front coding," Appl. Opt. 34, 1859-1866 (1995).
7. J. Van Der Gracht, E. Dowski, M. Taylor and D. Deaver, "Broadband behavior of an optical-digital focus-invariant system," Opt. Lett. 21, 919-921 (1996).
8. W. Chi and N. George, "Electronic imaging using a logarithmic asphere," Opt. Lett. 26, 875-877 (2001).
9. J. O. Castaneda, E. Tepichin and A. Diaz, "Arbitrary high focal depth with a quasi optimum real and positive transmittance apodizer," Appl. Opt. 28, 2666-2669 (1989).
10. Y. G. Leclerc and A. F. Bobick, "The direct computation of height from shading," CVPR, 552-558 (1991).
11. R. Zhang and M. Shah, "Shape from intensity gradient," SMC-A, 29, 318 (1999).
12. B. K. P. Horn, "Height and gradient from shading," IJCV, 5, 37-76 (1990).
13. M. Asada, H. Ichikawa, S. Tjtuji, "Determining of Surface Properties by Projecting a Stripe Pattern," IEEE Proc. of ICPR, 86 (1986).
14. M. Asada, H. Ichikawa, S. Tsuji "Determining Surface Orientation by Projecting a Stripe Pattern," IEEE Transact. on PAMI, vol. 10, no. 5 (1988).
15. L. Zhang, B. Curless and S. M. Seitz, "Rapid shape acquisition using color structured light and multi pass dynamic programming," 1st International Symposium on 3D data processing visualization and transmission (3DPVT), July 2002., Padova, Italy.
16. P. Besl, "Active optical range imaging sensors," Machine vision and applications, 1, 127-152 (1988).
17. E. Horn and N. Kiryatt, "Toward optimal structured light patterns," Proc. Int. Conf. On Recent advances in 3-D Digital Imaging and Modeling, 28-37, Ottawa Canada, May 1997.
18. J. Solomon, Z. Zalevsky and D. Mendlovic, "Super resolution using code division multiplexing," Appl. Opt. 42, 1451-1462 (2003).
19. Z. Zalevsky, J. Solomon and D. Mendlovic, "Geometrical super resolution using code division multiplexing," Appl Opt., 42, 32-40 (2005).

BACKGROUND OF THE INVENTION

Extended depth of focus, range extraction [1] and super resolved imaging [2-3] of imaging systems are three very important technologies investigated in the fields of imaging. Extending the depth of focus allows imaging system incorporation into various applications, including inter alia medically related applications where elements, such as cameras, are to be inserted into the body in order to observe and detect problematic tissues; as well as ophthalmic industry including glasses for spectacles, contact lenses, intraocular lenses or other lenses inserted surgically into the eye. The extended depth of focus solution is also needed for optical devices like microscopes or cameras for industrial, medical, surveillance or consumer applications, where focusing of light is required and where the conventional focusing techniques is based on the use of a multitude of lenses with the need of relative displacement between the focusing arrangement and an imager and/or object plane, by mechanical movement, either manually or electronically driven. A lot of approaches have been developed dealing with extended depth of focus based upon aperture coding, some of which are all-optical as described in Reference [4] and also in the US patent publication US2006/034003 assigned to the assignee of the present application, and some required digital post processing [5-9] in order to extract the focused image.

Many techniques were developed to deal with range extraction mainly by extraction of shape from shading while computing the gradients obtained in the image [10-12], scanning the object with a line and observing its curvature [13-14], high speed scanning based on active laser triangulation and a variety of fast to even real-time scanners [15] and triangulation [16-17].

Super resolution is an explored topic as well [2-3]. The resolution of a lens-based imaging system is defined by the finite dimensions of a lens. The resolving power or the minimum separation between two points which can be resolved is limited by the diffraction that takes place in the imaging system (e.g. microscope) because of the wave nature of light. Techniques aimed at achieving the super resolution deal with extending the resolution limit set by diffraction caused by the physical dimensions of the optics. The term "super resolution" refers to spatial resolution which exceeds the diffraction limitation caused by the wave nature of light, and signifies a resolution which is greater than one-half the wavelength of the light actually being used. Digital imaging provides for exceeding the limit set by a non-zero pixel size of a photodetector (e.g., CCD), i.e., the geometrical resolution. The geometrical super resolution may also be based upon orthogonal aperture coding as described in WO2004/102958 assigned to the assignee of the present application and references [18; 19].

GENERAL DESCRIPTION

The present invention provides a new technique and an imaging system, extending the depth of focus, allowing digital estimation of the distance to various objects in the field of view (i.e. range extraction), and overcoming the geometrical resolution limitation. This new technique is based on the coding of an aperture plane with a random phase, allowing extracting significantly extended depth of focus, estimation of ranges of objects in the field of view and improving the geometrical resolution of the detector of the imaging system. The new technique of the present invention allows digital estimation of the distance to various objects in the field of view, by decoding the sampled output of the detection unit indicative of the data information of a single image, and does not require any triangulation-based processing of multiple images. Moreover, the enhanced geometrical resolution is also provided by decoding the sampled output of the detection unit indicative of the data information of a single image. It should be noted that the sampled output of the detection unit may be the OTF distribution of the imaging system, affected by the random mask aperture coding.

The proposed technique reduces the optical requirement for the imaging lens since there is no longer a need in correcting phase aberrations, but it also reduces the signal to noise ratio of the obtained information and the contrast, and involves digital processing. In order to extract the focused, super resolved image in which the distance to all the objects in the field of view are known, digital computation having a complexity similar to a Fast Fourier Transform (FFT) algorithm has to be applied.

The random phase of the aperture plane (or mask) is an arbitrary selected mask and a priori known. It should be noted that the distribution of the spaced-apart transition regions forming the mask pattern) is completely random and does not follow any symmetry laws. The randomness of this phase pattern allows increasing the depth of focus and estimating the range to the various objects in the field of view of the imager. In addition, it allows increasing the geometrical resolution of the imager by orthogonal coding of the spectral bands prior to their folding due to the under sampling by the imager as will be detailed below.

The random phase mask is located in the aperture plane of an imaging lens of an imaging system. The mask may be a separate from the lens element positioned in the exit/entrance pupil plane of the imaging lens, or may be integrated (or embedded) in the lens. The distribution of an Optical Transfer function (OTF) of the imaging system is thus also determined by this random phase together with quadratic phase factor that mathematically represents out of focus effect. The effect of the randomness of the phase dominates over quadratic phase factor thus producing extension in focus depth. Since OTF construction involves autocorrelation of random mask, OTF gains random property as well (less than random mask itself). The result is that a one to one mapping (linear correlation) is generated between the resulted OTF random distribution and every axial distance. The linear correlation between the known OTF random phase distribution and every axial distance allows extraction of 3-D information of objects located in the field of view of the imager. Moreover, knowing the randomness of this phase or using appropriate filtering (as will be described below) enabling complete removal of phase allows to recover the aliased information and to obtain geometrical super resolved imaging. The 3-D information may be digitally extracted by multiplying the OTF with a different random phase distribution corresponding to a different axial distance. Since the random phase mask is located in the CTF plane of the imaging lens., the OTF is much less sensitive in its amplitude to getting out of focus and therefore almost infinitely extended depth of focus is obtained.

There is therefore provided an imaging system for imaging objects, the imaging system comprising an imaging lens arrangement, a light detector unit at a certain distance from the imaging lens arrangement, and a control unit connectable to the output of the detection unit. The imaging lens arrangement comprises an imaging lens and an optical element located in the vicinity of the lens aperture, said optical element introducing aperture coding by an array of regions differently affecting a phase of light incident thereon which are randomly distributed within the lens aperture, thereby generating an axially-dependent randomized phase distribution in the Optical Transfer Function (OTF) of the imaging system resulting in an extended depth of focus of the imaging system. The control unit is configured to decode the sampled output of the detection unit by using the random aperture coding to thereby extract 3D information of the objects in the field of view of the light detector unit.

The control unit may be configured to provide a range estimation of the distance of different objects in the field of view of the detector. The range estimation may be provided by decoding the sampled output of the detection unit indicative of the data information of a single image.

In some embodiments, the control unit is configured to provide an image resolution for at least a part of the field of view exceeding by a predetermined factor a geometrical resolution defined by the light detector unit.

The enhanced geometrical resolution may be provided by decoding the sampled output of the detection unit indicative of the data information of a single image.

In some embodiments, the optical element is configured to reduce a quadratic factor phase resulting from light getting out of focus of the imaging lens and maximize a defocused OTF of the imaging system by providing the out of focus OTF as much as possible away from zero. The optical element may be configured to configured to generate an orthogonal coding of the various spectral bands in the OTF plane prior to being aliased, enabling the recovering of the aliased information resulting in the re-separation and the reconstruction of the spectral bands, and the enhancement of the image resolution for at least a part of the object exceeding by a predetermined factor a geometrical resolution defined by the light detector unit.

The random phase aperture coding may be positioned in the exit pupil plane of the imaging lens, or in the entrance pupil plane of the imaging lens.

In some embodiments, the imaging lens arrangement and the light detector unit are optically aligned and stationary mounted.

The optical element may have a different random phase distribution for each wavelength corresponding to the red, green and blue spectra.

There is also provided an imaging method comprising applying an aperture coding to an imaging lens, said aperture coding comprising affecting phase of light by randomly distributed different phase affecting regions within the lens aperture thereby generating an axially-dependent randomized phase in the Optical Transfer Function (OTF) distribution, resulting in an extended depth of focusing; and processing data indicative of an image of a region of interest to provide a linear correlation between the random phase distribution and each axial distance, and to extract 3D information on imaged objects in the region of interest from the linear correlation.

In some embodiments, extracting 3D information is obtained by multiplying the OTF with different random phase corresponding to different axial distance.

The method may comprise optical processing of the light signal with a function coding, so as to provide orthogonality of spectral data indicative of a sampled output of a detector. The orthogonality of spectral data may increase the geometrical resolution of the detector.

In some embodiments, the method comprises applying a filtering to reduce the amount of noise.

BRIEF DESCRIPTION OF THE FIGURES

In order to understand the invention and to see how it may be implemented in practice, and by way of non-limiting example only, with reference to the accompanying drawing, in which FIG. 1 schematically illustrates an example of the imaging system of the present invention.

DETAILED DESCRIPTION OF PREFERRED EMBODIMENTS

Figure 1:
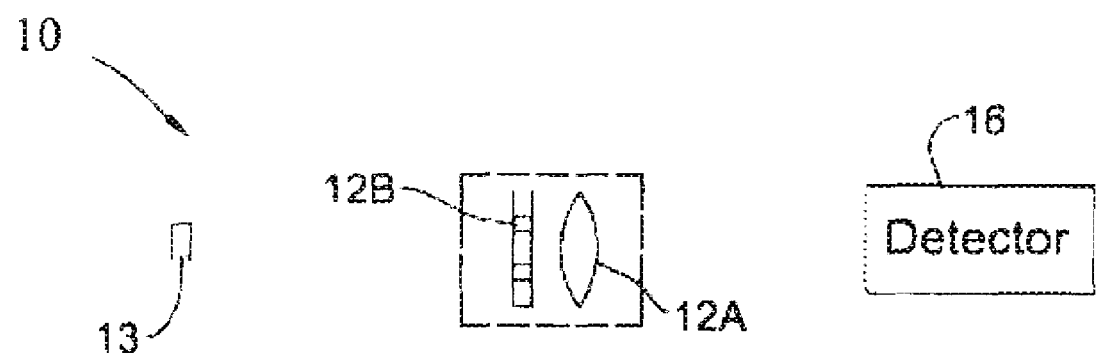

Reference is made to FIG. 1, schematically illustrating an example of an imaging system 10 configured and operable according to the invention. The imaging system 10 is associated with an object 13 to be imaged, and includes an imaging lens arrangement 12, and a light detector unit 16 associated with a control unit 18. The lens arrangement 12 includes a tensing element 12A and an optical element of random-phase aperture coding 12B. The imaging lens arrangement 12 (lensing element and random-phase aperture coding element) and the light detector unit 16 are preferably optically aligned and stationary mounted. The optical element 12B is configured as a random-phase aperture having phase-affecting pattern of transition regions. Preferably, as shown in the present example, the mask 12B is a separate element attached to the imaging lens or located close to the entrance/exit pupil thereof. Alternatively, the mask 12B may be implemented integral with the lens, namely as a pattern on the lens surface.

The mask 12B together with the lens 12A regions defines a pattern formed by regions differently affecting the phase of light passing therethrough. The random-phase aperture, also called random plate in the aperture plane, can be composed out of an opaque plate with randomly distributed optical windows creating a random transmission/blocking distribution, or it can be composed out of a transparent plate with randomly distributed diffusing islands creating a random phase distribution (i.e. out of a diffuser), or it can be composed out both a random pinhole pattern and a diffuser. It should be understood, that the OTF of the imaging system is defined by autocorrelation function of the imaging lens arrangement which in turn depends on the autocorrelation function of the random-phase mask, where the randomness of the phase mask results in a characteristic autocorrelation function of the mask especially by generating OTF with axially dependent randomized phase. The random aperture is comprised of a random array of windows, which transmits/blocks light independently of other windows, having a phase modulating value varying from 0° to 360°. The phase modulating values affects the windows, which are distributed randomly within the mask. The windows may have any geometry (e.g. rectangular, circular, etc.).

The randomness of the phase distribution within the aperture provides a random pattern differently affecting the phase of the light passing therethrough to generate random phase distribution of light in the Optical Transfer Function (OTF) distribution. Due to the random phase distribution in the lens aperture, the OTF distribution of the imaging system has an axially-dependent randomized phase. This axially-dependent randomized phase distribution will thus be the dominant variation of the OTF function within its distribution. The randomness of the phase effects within the mask (lens aperture) reduces a quadratic phase factor resulting from light getting out of focus of the imaging lens and thus maximizes a defocused OTF (i.e. OTF's contrast optimization) of the imaging lens arrangement by providing the out of focus OTF as much as possible away from zero.

The control unit 18 performs the auto correlation of the CTF to compute the optical transfer function (OTF) of the imaging system. As indicated above, the mask 12B is designed to maximize the defocused OTF of the imaging system 10, by generating invariance to quadratic phase factor (which factor is generated when the image is defocused and multiplies the CTF of the imaging lens 12A).

It should be noted that the technique of the present invention is used with incoherent light. While optics used for imaging with coherent light is characterized by Coherent Transfer Function (CTF), optical techniques (methods and systems) used for imaging with incoherent light are compared by their corresponding Modulated Transfer Functions (MTFs) or Optical Transfer Functions (OTFs). While MTF is an absolute value of respective OTF; and OTF is an autocorrelation of respective CTF. Since the inventors have aimed at high quality imaging with incoherent light, they have allowed themselves a broader freedom in choice of optical elements' phase profiles and CTFs.

Let's assume that in the aperture plane, a random phase has been located such that the CTF Diane can now be expressed as:

$$CTF(x) = P(x)\exp[i\phi(x)] = \exp[i\phi(x)] \cdot rect\left(\frac{x}{\Delta x}\right) \quad (1)$$

where x is the coordinate of the aperture plane, $\phi$ is the random phase and P(x) is the aperture shape (rectangular shape in the present example with a width of $\Delta x$). For simplicity a 1-D derivation is achieved. The OTF is the autocorrelation of the CTF and it equals to:

$$OTF(\mu; Z_i) = \frac{\int_{-\infty}^{\infty} P\left(x + \frac{\lambda Z_i \mu}{2}\right)\exp\left(i\phi\left(x + \frac{\lambda Z_i \mu}{2}\right)\right)P^*\left(x - \frac{\lambda Z_i \mu}{2}\right)\exp\left(-i\phi\left(x - \frac{\lambda Z_i \mu}{2}\right)\right)dx}{\int_{-\infty}^{\infty} |P(x)|^2 dx} \quad (2)$$

where $Z_i$ is a distance between the imaging lens arrangement and the detector, $\lambda$ is the wavelength of light.

The total OTF is integrated through the wavelength spectrum. $OTF(\mu;Z_i) = (\lambda,\mu;Z_i)d\lambda$ Since the phase distribution within the mask is random, the auto-correlation expression of the OTF may be approximated as:

$$OTF(\mu; Z_i) = \delta(\mu) + A(\mu; Z_i)\exp(\phi(\mu; Z_i)) \cdot rect\left(\frac{\mu\lambda Z_i}{2\Delta x}\right) \quad (3)$$

where A is a random amplitude distribution and $\phi$ is a random phase.

When defocusing aberrations are introduced, the generalized pupil function can be described as:

$$P(x) = |P(x)|\exp[ikW(x)] \quad (4)$$

where W(x) is the wave aberration and $k=2\pi/\lambda$, while W(x) has the form of:

$$W(x) = W_m \frac{x^2}{(\Delta x/2)^2} \quad (5)$$

The coefficient $W_m$ determines the severity of the quadratic aberration. The (geometrical) degree of defocusing is characterized by this coefficient $W_m$, being:

$$W_m = \frac{\Psi\lambda}{2\pi} \quad (6)$$

where $\psi$ is a phase factor representing the amount of getting out of focus:

$$\Psi = \frac{\pi(\Delta x)^2}{4\lambda}\left(\frac{1}{Z_i} + \frac{1}{Z_o} - \frac{1}{F}\right) \quad (7)$$

where $Z_o$ is the distance between the imaging lens and the object, $Z_i$ is the distance between the imaging lens and the detector and F is the focal length of the imaging lens.

When imaging condition is fulfilled, $$\frac{1}{Z_i} + \frac{1}{Z_o} = \frac{1}{F}, \quad (8)$$

no defocusing aberrations are introduced and the phase factor $\psi$ equals zero.

When the defocusing aberrations are introduced, the OTF from Eq.3 becomes:

$$OTF(\mu; Z_i) = \delta(u) + A(\mu, W_m; Z_i)\exp(\phi(\mu, W_m; Z_i)) \cdot rect\left(\frac{\mu\lambda Z_i}{2\Delta x}\right) \quad (9)$$

Although $A(\mu,W_m;Z_i)$ depends on the amount of defocusing $W_m$, its average value $<A(\mu,W_m;Z_i)>$ does not depend on $W_m$ and it is always away of zero.

Figure 2A:
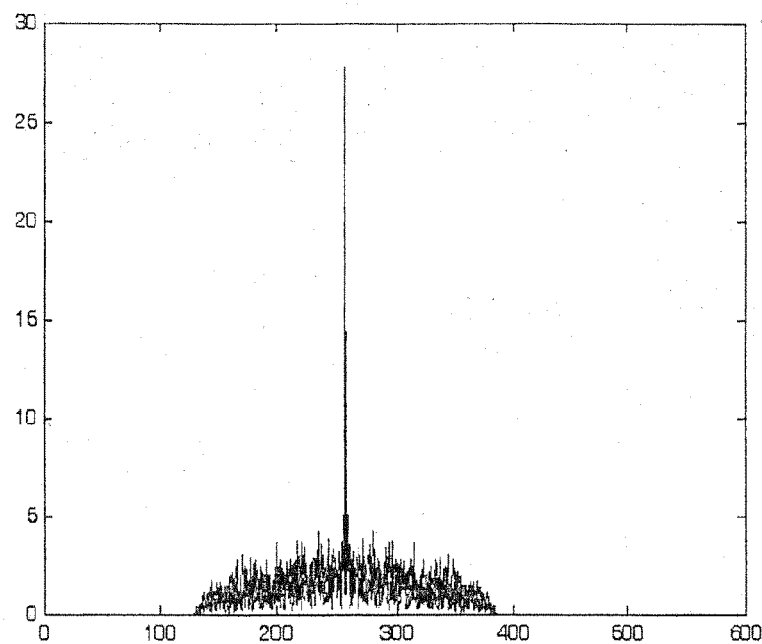
FIG. 2*a* graphically represents an obtained OTF (not normalized) with an optical element of random aperture coding for defocusing of up to $\Psi=16$.

Reference is made to FIG. 2a representing an obtained OTF (not normalized) with an optical element of random aperture coding for defocusing of up to $\Psi=16$ (where $\psi$ is a phase factor representing the amount of getting out of focus). The OTF is relatively flat for all the defocusing distortions except for a strong DC (the peak in the OTF which is the spectral plane). Applying a proper Wiener filtering (to reduce the amount of noise present in a signal by comparison with an estimation of the desired noiseless signal) can provide inverse of the spectral distortion since all the spatial information was transmitted.

Figure 2B:
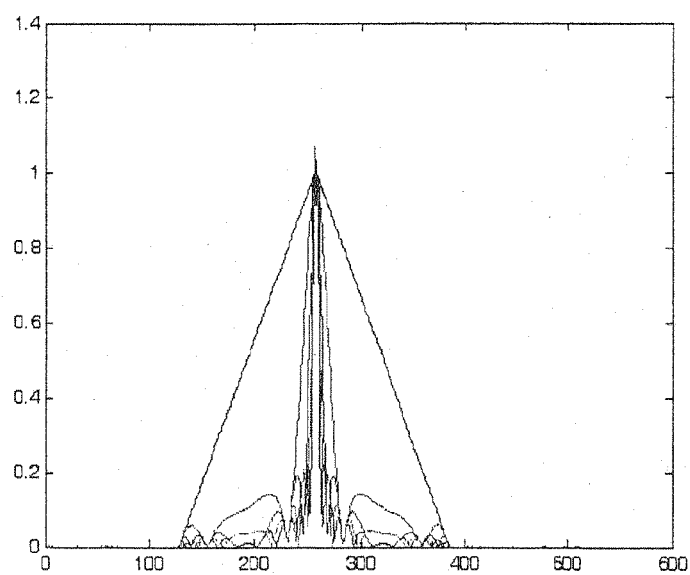
FIG. 2*b* graphically represents a defocused OTF without the use of the optical element.

In FIG. 2b, for the sake of comparison, a defocused OTF is represented without the use of the optical element for $\Psi$ of up to 16. Different graphs in FIGS. 2a and 2b correspond to different values of $\Psi$. The value of $\psi$ varies from zero and up to the limit of 16 in jumps of 4 (graph G1 is for $\Psi=0$ and graph G2 is for $\Psi=16$).

It should be noted that the random phase of the OTF provides very interesting features which are not only related to extended depth of focusing. One interesting feature is related to the capability of extracting the 3-1) information of objects in the region of interest. Since the phase $\phi$ depends on the defocusing factor $W_m$, the Wiener filter that is required to invert the spectral distortion depends on $W_m$ as well. Since the focal length F of the lens as well as the distance between the detector and the lens is fixed, the dependence of the image restoration on $W_m$ actually means that it has strong dependence on the distance $Z_o$. Thus, the restoration filter depends on $Z_o$ and only due to the random phase $\theta$ of the OTF, the dependence is very selective: the OTF phase distribution varies significantly for small $Z_o$ increments. The minimal distance between two objects at $Z_o$ and $Z_o'$ that could be discerned, is inversely dependent on the correlation length of random mask 12B. Therefore only the objects that are at specific $Z_o$ distance will be restored while the others will remain blurred. Such a property can easily be used for estimating the distance $Z_o$ to a specific object in the field of view of the light detector unit (e.g. camera) as long as the object is not positioned beyond the hyper focal distance (near field) beyond which the $W_m$ is more or less equals to zero.

Figure 3:
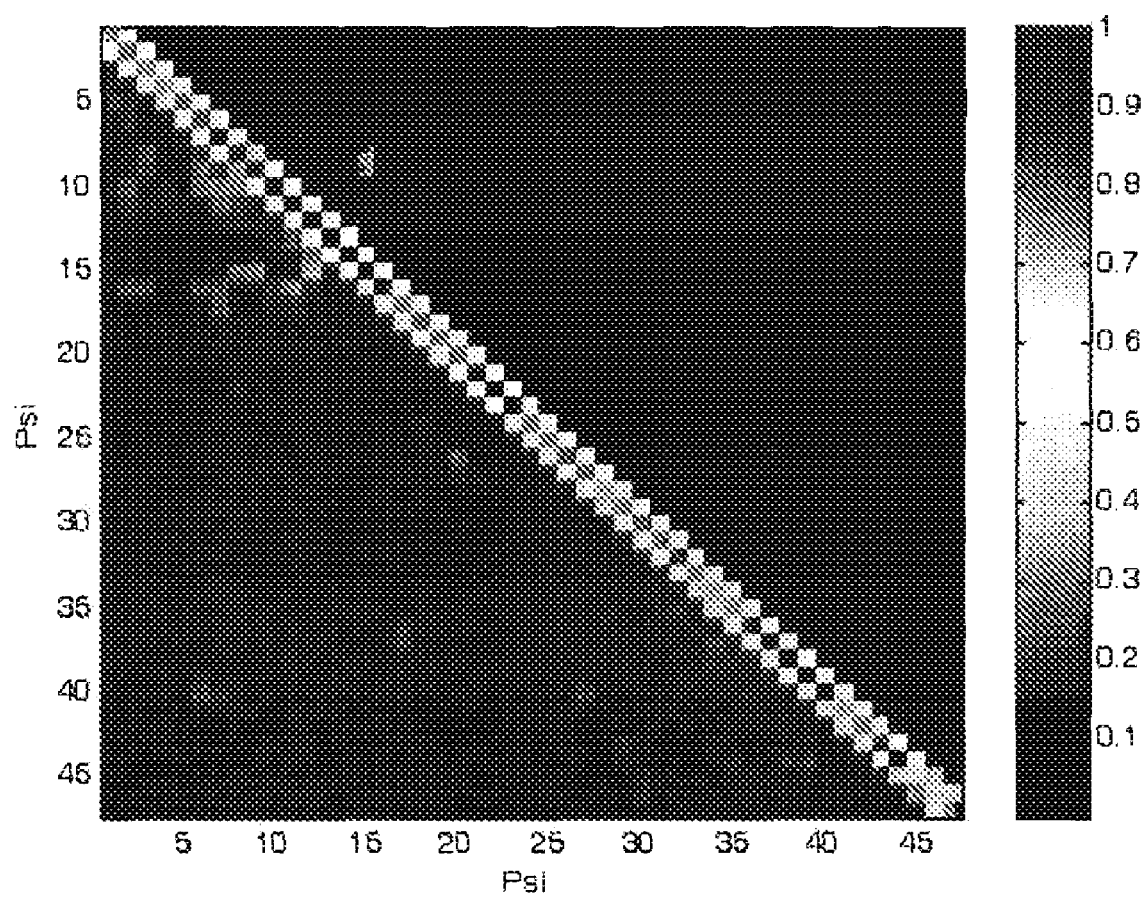
FIG. 3 graphically represents a covarianice matrix of different defocusing axial positions, providing 3-D information extraction.

The 3-D information extraction of objects is illustrated in FIG. 3. The figure depicts the covariance matrix presenting the cross-correlation peaks of the various values of OTF for different amounts of defocusing. The defocusing was measured in $\Psi$ units, i.e. the horizontal and vertical axes of the covariance matrix are in $\Psi$ units. The diagonal line of the covariance matrix seen in FIG. 3 indicates that indeed the various axial defocusing distances are orthogonal and thus indeed a one to one mapping of ranges is possible.

Another interesting application of the proposed technique is related to super resolution. When the diffraction limit is less restricted than the geometrical resolution limitation, the coding of the aperture enables obtaining geometrical super resolution since the light passes through the coded aperture prior to being sampled by the detector. The random phase distribution within the mask generates orthogonal coding of the various spectral bands in the OTF plane prior to being aliased due to the under sampling of the detector (reduced geometrical resolution). Knowing this random phase distribution allows to recover the aliased information and to obtain geometrical super resolved imaging.

The aliasing effect is associated with the following: if an object scene (or its region) has a relatively energetic spatial harmonic with a spatial frequency greater than the Nyquist frequency of the light detection unit, then capturing of this object scene is accompanied by undersampling of this harmonic. The harmonic is captured as it has a different (lower), "alias", spatial frequency. This leads to the appearance of a distortion of the object scene (or of its region) captured in the image. Therefore, any attempt to capture image detail with a spatial frequency slightly greater than the Nyquist frequency (i.e., that of the photodetector pixel array) results in a spatial or dimensional distortion of that detail. i.e. individual image points are stretched, shrunk, or displaced to fit the pixel array, and if such fine detail covers any appreciable area, then visible aliasing occurs. Practically, aliasing occurs when the image resolution is more than half of that of the detector (Nyquist sampling rate). The imaging system is configured such that it stays diffraction-limited for any position of a point source, as soon as the point source stays in the in-focus object plane, and for any level of the zoom. In this regard, it should be understood that not only the size of the diffraction-limited spot may vary depending on the location of the point source, but also the PSF itself (as a whole) may vary depending on this location. The diffraction-limited spot is merely a width of the PSF; when the shape of the PSF changes, the diffraction-limited spot also changes. Accordingly, the CTF and the MTF, respectively defined as Fourier transforms of the PSF and the squared PSF, may have one shape for one point source location and/or zoom level and another shape for another point source location and/or zoom level.

In some embodiments, the present invention utilizes a predetermined random aperture coding of the wavefront of a light signal, indicative of at least a part of the object to be imaged with the enhanced resolution, while propagating towards a light detection unit (e.g. a detector pixel array), such as to allow for using this random aperture code to decode a sampled output of the light detection unit resulting from the aliasing occurring in the detector plane, to thereby reconstruct the image with the enhanced resolution. Here, the term "enhanced resolution" signifies resolution higher than that defined by the pixel size of the detector (geometrical resolution).

The present invention provides the enhancing of resolution of an image of at least a part of the object by a required factor k, due to utilizing an appropriate aperture coding. The latter consists of optical processing of the light signal with a function (code) predetermined in accordance with aliasing occurring in the detector plane, and so as to provide orthogonality of spectral data indicative of a sampled output of the detector. It should be understood that the maximal value of resolution enhancement k (zooming factor) is defined by a pixel pitch $\Delta x$ of the detector, wavelength $\lambda$, and F-number, $F_\#$, of the imaging system, namely $$k = \frac{\Delta x}{\lambda \cdot F_{ij}}.$$

The aperture coding function is a function of such parameters as: the factor, k, of the required resolution enhancement, the parameters of the detector pixel array (number N of pixels in the detector and pixel pitch $\Delta x$), and the imaging parameter, which is typically determined as a distance V between an imaging lens and the detector plane. Preferably, the aperture code is also a function of wavelength.

Figure 4:
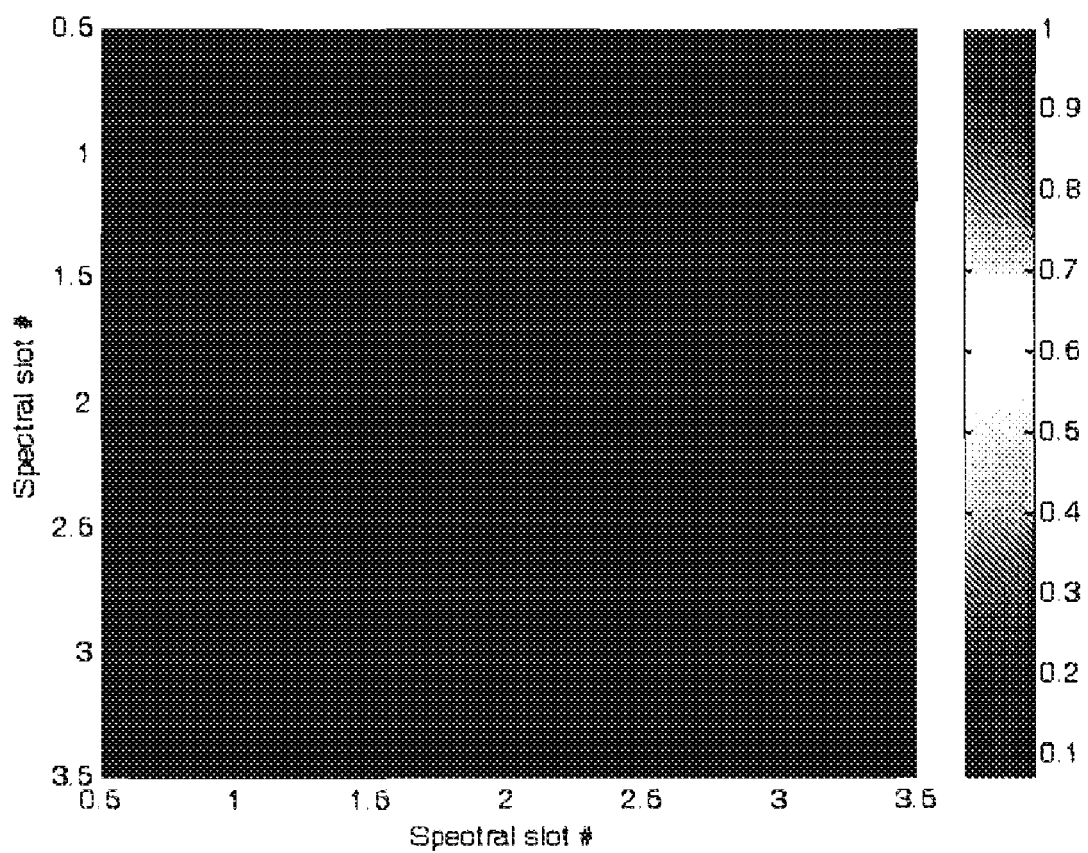
FIG. 4 graphically represents a covariance matrix in which the orthogonality of the three spectral bands composing the OTF is represented.

As described in WO2004/102958 assigned to the assignee of the present application, the inventors have used orthogonal aperture coding to obtain geometrical super resolution. In the present invention, the phase $\phi$ of the resulted OTF is random and axially-dependent resulting in an orthogonal coding of the spectral bands in the OTF plane. For instance, following the example presented in Ref. [19], the spectrum was divided into three bands and mixed together after sampling. This example describes aliasing occurring in the case where the spatial sampling is three times spatially less dense in comparison to the diffraction limit, i.e. the sampling pixel is three times larger than the point spread function due to diffraction. The covariance matrix presented in FIG. 4 designates that indeed no correlation exists between the three spectral bands (the values were obtained only in the diagonal of the matrix). This orthogonality indicates that three times super resolution may be realized and that after mixing, the three spectral bands can be re-separated and reconstructed.

Figure 5A:
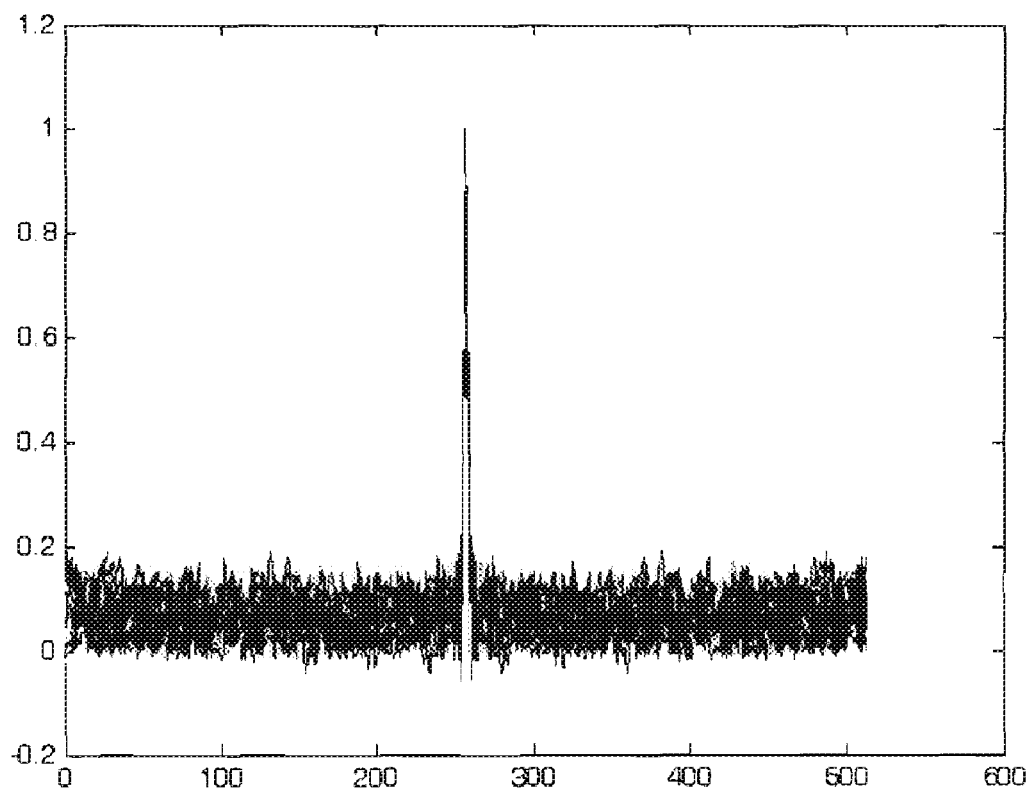
FIG. 5*a* graphically represents the PSF obtained with a random aperture coding for defocusing with $\Psi$ of up to 110.
Figure 5B:
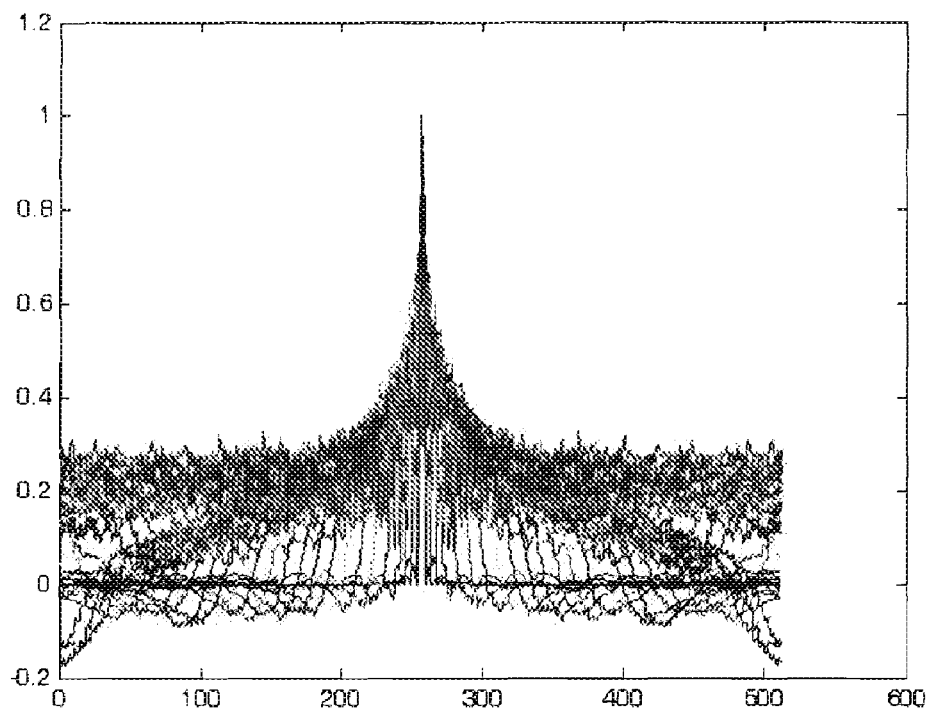
FIG. 5*b* graphically represents the PSF obtained with regular defocusing for $\Psi$ of up to 110.
Figure 6A:
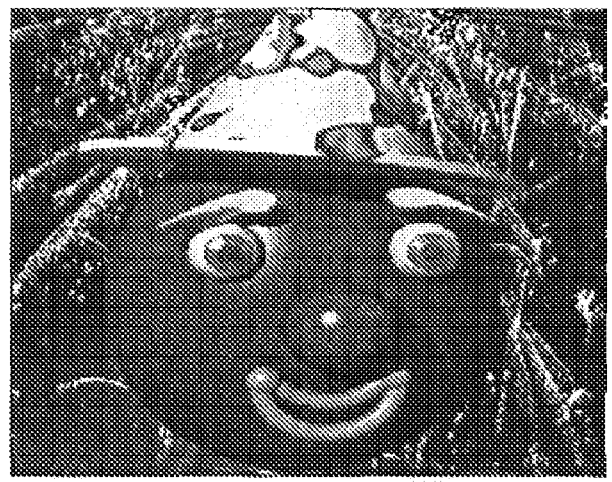
FIG. 6*a* depicts an in-focus reference image.

Reference is made to FIG. 5 representing the point spread function (PSF) (i.e. the inverse Fourier transform of the OTF) for different defocusing aberrations expressed through $\Psi$. The PSF was computed not by performing a complete Wiener filter but rather only by canceling the random phase $\phi$ in the OTF plane. The result obtained is illustrated in FIG. 5a representing the PSF as a delta function to which a low level noise is added. The low level noise causes contrast reduction after convolving this PSF with the image of the object. The obtained PSF for the same defocusing aberrations without applying the technique of the present invention is represented in FIG. 5b. In this case, when the image is defocused, no delta function is obtained. The imaging performance of the technique of the invention is represented in FIG. 6. In FIG. 6a an in-focus image, which was defocused with $\Psi$ of 120 is represented.

Figure 6B:
FIG. 6*b* depicts an image obtained with random aperture coding and Wiener filtering for defocusing of $\Psi$ of 120.

FIG. 6b represents the same image adding a random phase on the aperture of the imaging lens and performing full inverse Wiener filtering to recover the image.

Figure 6C:
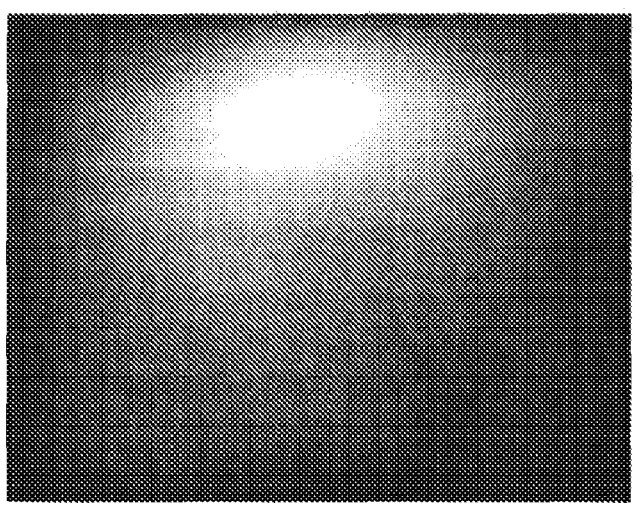
FIG. 6*c* depicts an image obtained without aperture coding and with applying the Wiener filtering for reconstruction.

FIG. 6c represents the same image without adding a mask. In both cases of FIGS. 6b and 6c, a Weiner filter was applied. The filter was equal to the inverse of the spectral distortion (inverse filter) for contrast of above 5% and it was equal to the absolute value (phase only filter) of the spectral response for contrasts below 5%. As seen, the image of FIG. 6b is very similar to FIG. 6a while the image of FIG. 6c is completely distorted.

The present invention provides the extended depth of focus and axial ranging capabilities of random phase mask. The mask was found by an iterative routine, calculating its figure of merit. The random mask producing the highest figure of merit was chosen. The parameter for the figure of merit that was chosen was the area under the OTF for a certain band of spatial frequencies, for three object distances (or for three ψ numbers). The axial ranging ability of the resulted mask was inherent, since the random mask induces phase variations in OTF of the resulted imaging system, which are highly dependent on the out of focus parameter ψ.

Figure 7:
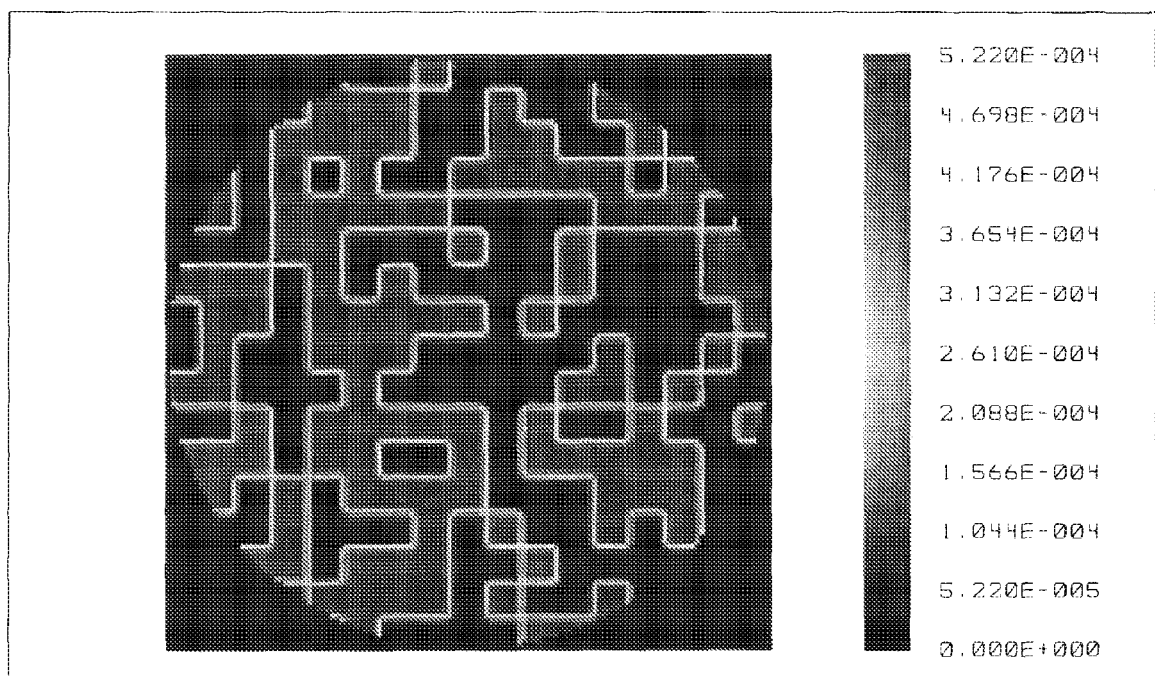
FIG. 7 graphically represents a random phase mask with 0, $\pi$ transitions simulated for BK7 substrate.

The experiment was first simulated on the Zemax Optical design software. The imaging system was with F# of 2.8 and aperture diameter of 1.6 mm. The selected mask was generally a binary mask (0, π) with each pixel of 90 micron, where these binary features were randomly distributed within the mask. To obtain even higher degree of randomness, smaller pixels can be used. As represented in FIG. 7, about 25×25 pixels file the entrance pupil of the lens.

Figure 8A:
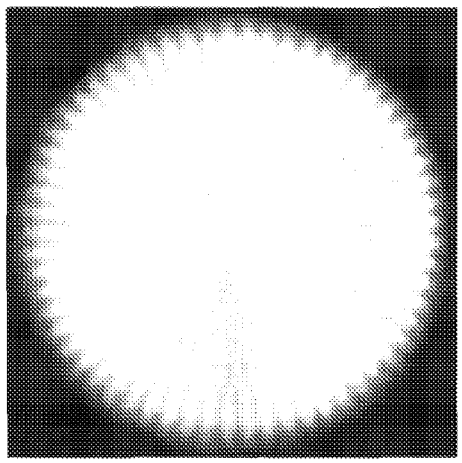
FIG. 8*a-c* depict a resolution target images taken at 50 mm, 60 mm and 70 mm without random mask and *d-f* with random mask; g represents a focused resolution target.
Figure 8D:
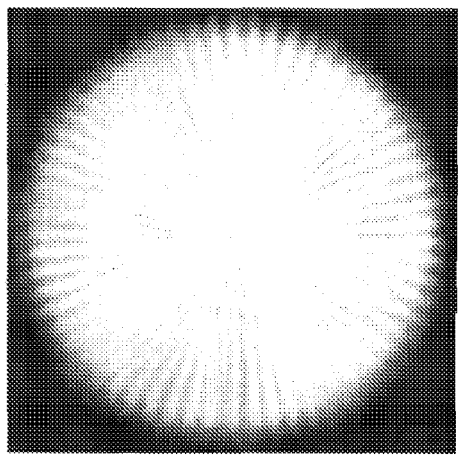
Figure 8B:
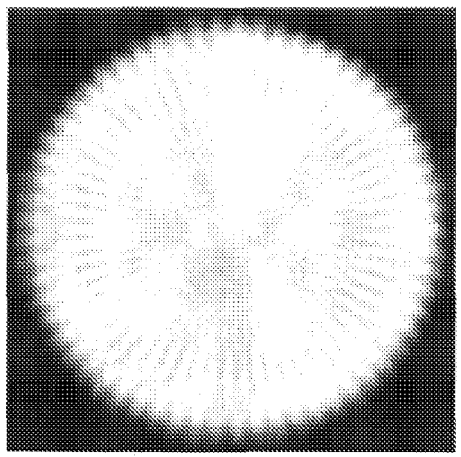
Figure 8E:
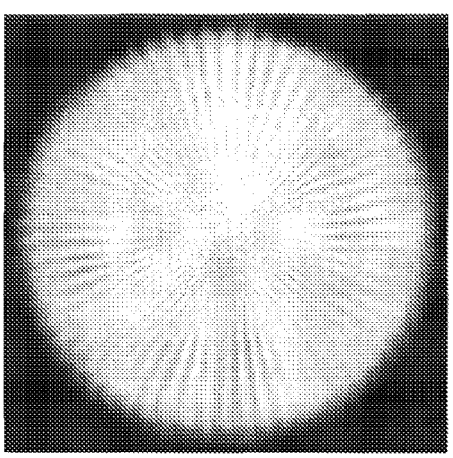
Figure 9A:
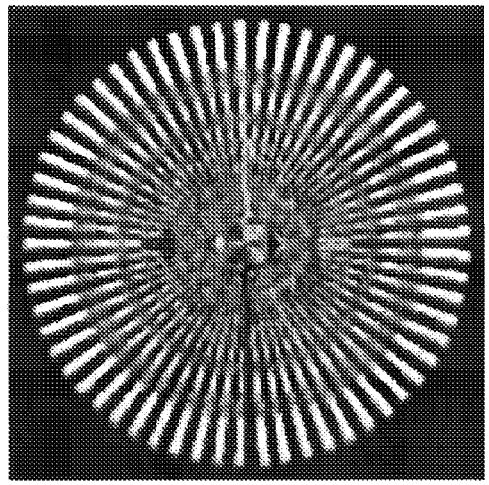
FIG. 9 *a-c* depict a deconvolved target image taken at 50 mm, 60 mm, 70 nm without random mask, and *d-f* with random mask.
Figure 9D:
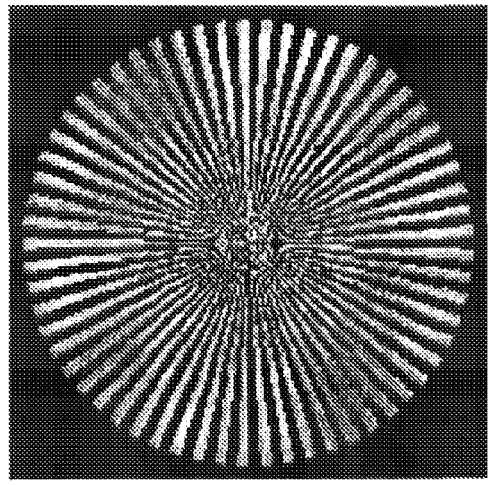
Figure 9B:
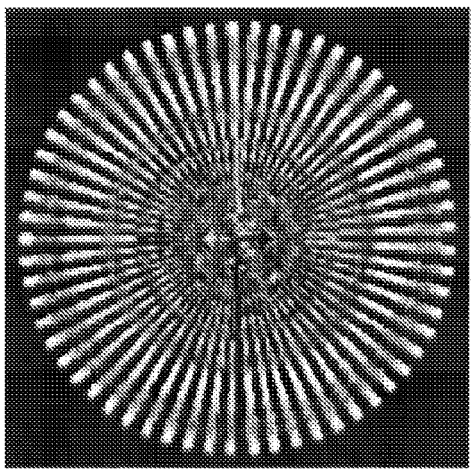
Figure 9E:
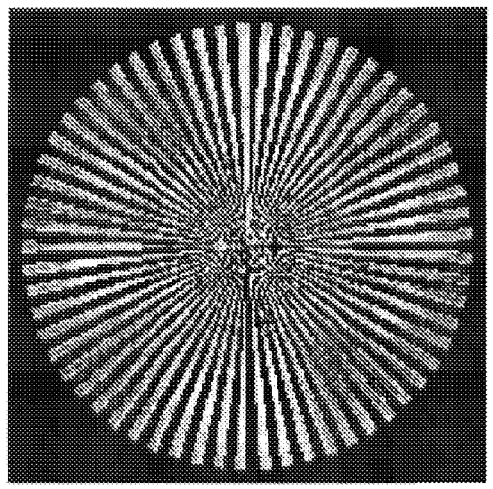
Figure 9C:
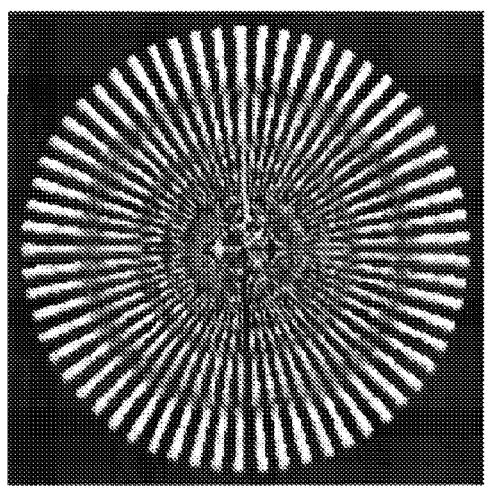
Figure 9F:
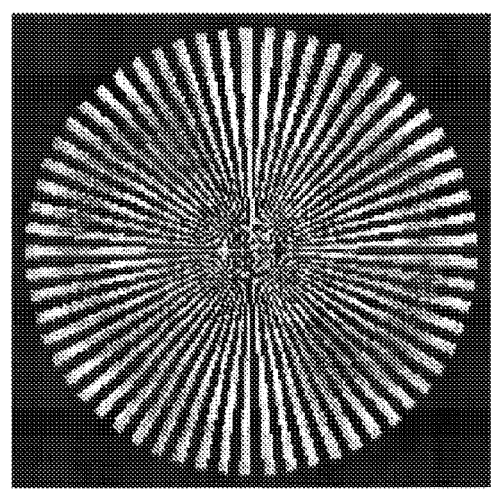
Figure 10A:
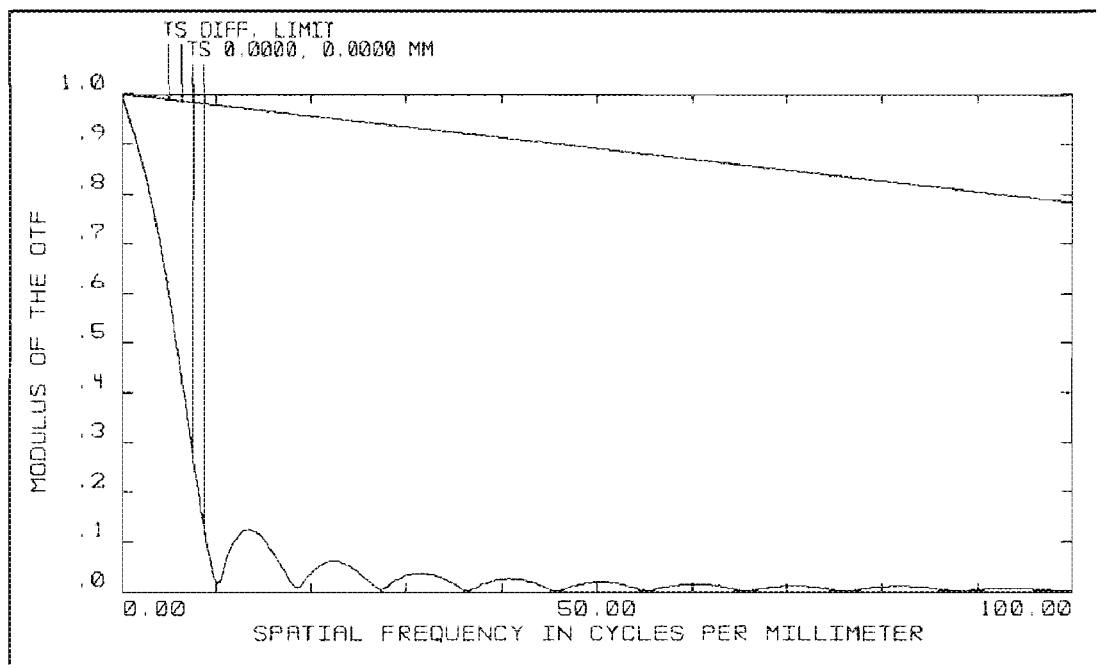
FIG. 10 *a-c* graphically represents MTF plots taken at 50 mm, 60 mm, 70 mm without random mask, and *d-f* with random mask.
Figure 10B:
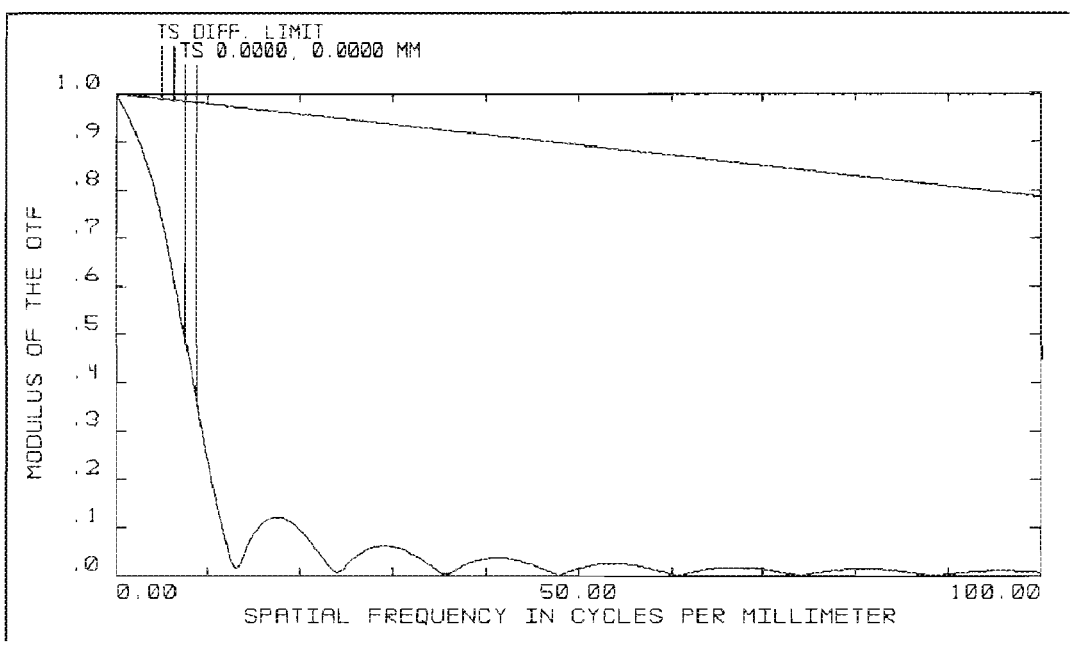
Figure 10C:
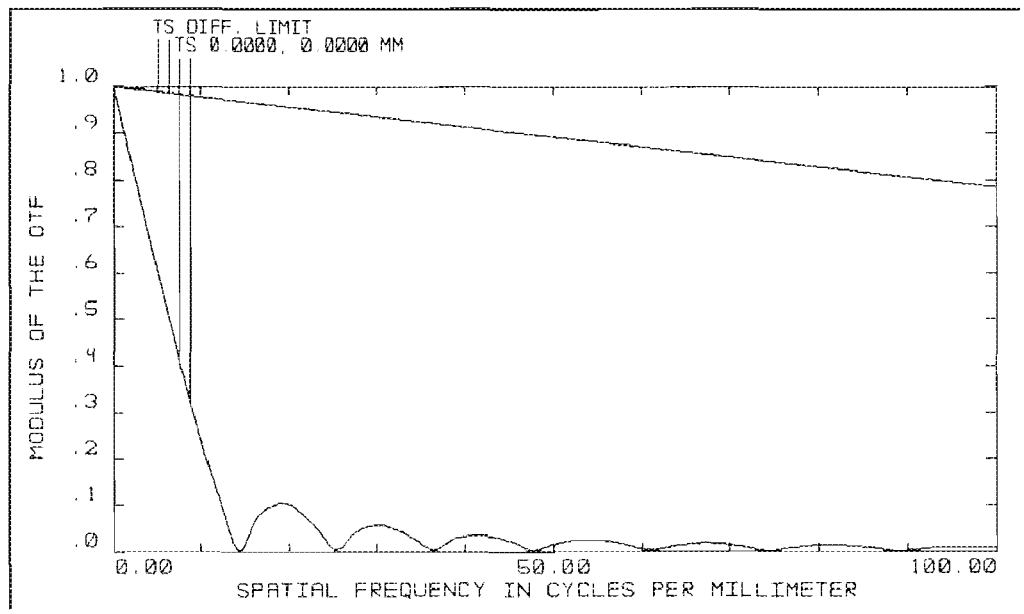
Figure 10D:
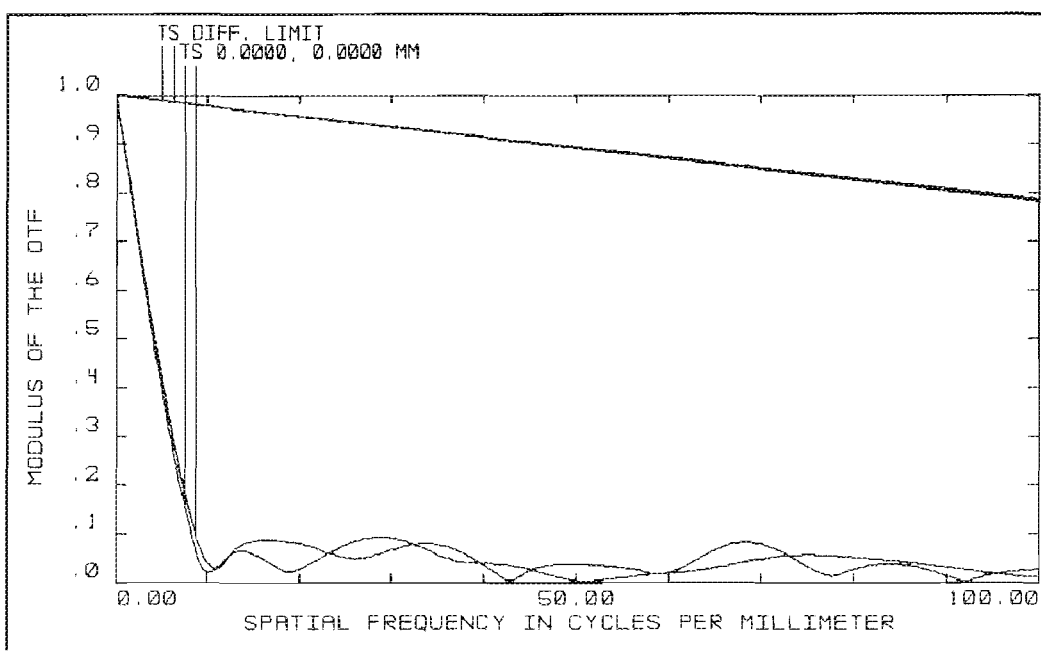
Figure 10E:
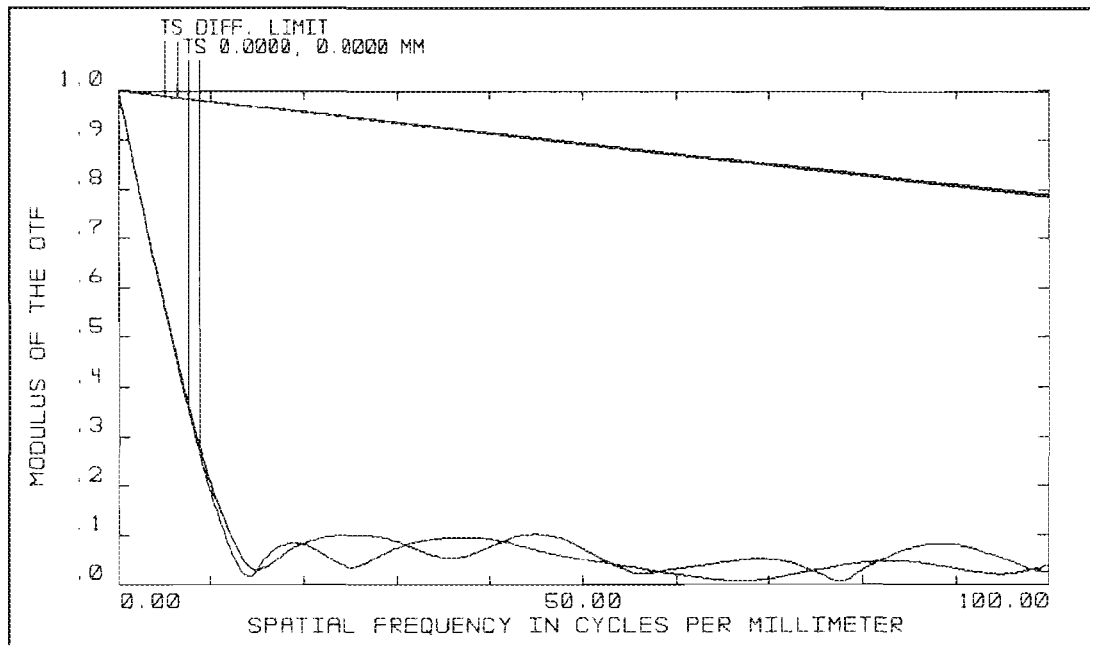
Figure 10F:
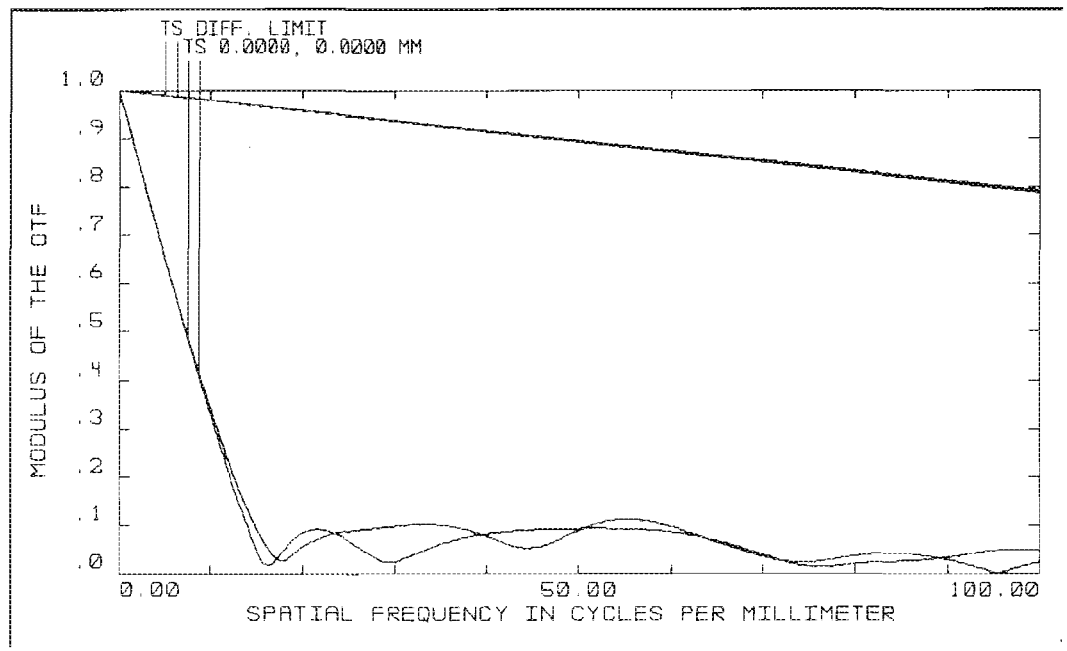
Figure 11A:
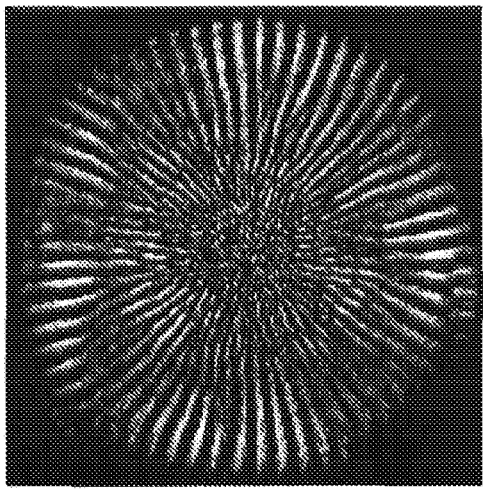
FIG. 11 illustrates a cross filtering noise; a represents an image obtained when object at 50 mm is deconvolved by filter suited for 60 mm; b represents an image obtained when object at 60 mm is deconvolved by filter suited for 50 mm; c represents an image obtained when object at 60 mm is deconvolved by filter suited for 70 mm; d represents an image obtained when object at 70 mm is deconvolved by filter suited for 60 mm.
Figure 11B:
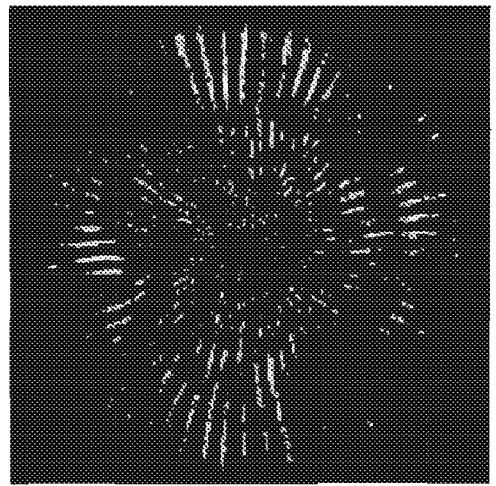
Figure 11C:
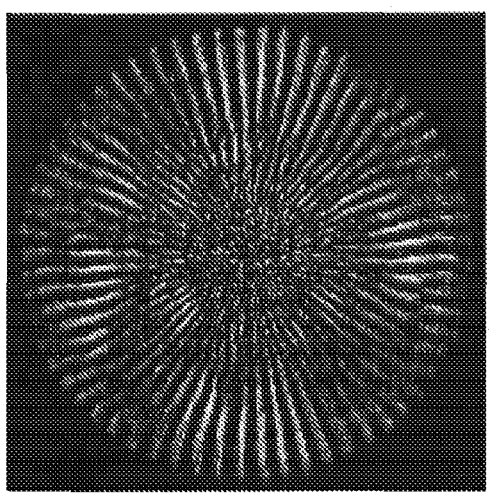
Figure 11D:
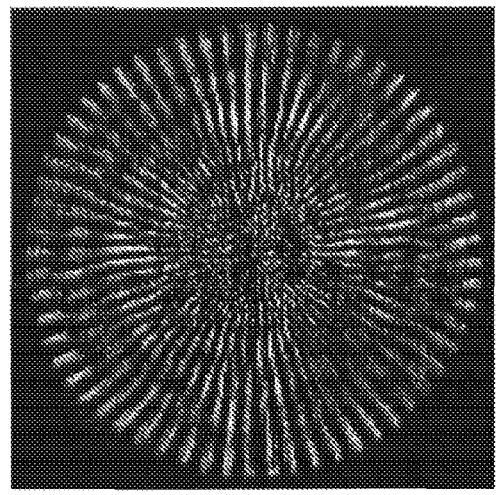

The simulations were performed for three different distances of the object—50 mm, 60 mm and 70 mm, which correspond to ψ=60, 48 and 38. The system was focused to 300 mm. The obtained images without and with the random phase mask are depicted in FIG. 8. FIGS. 8a, b and c present the image while the object was at 50 mm, 60 mm and 70 mm when no random mask was used. FIGS. 8d, e, and f represent the same with the random mask. In FIG. 8g, the focused resolution target used for this simulation is represented.

After applying proper Wiener inverse filtering, the images presented in FIG. 9 are obtained. In FIGS. 9a, b and c, the reconstructed images without using the random mask are shown. In FIGS. 9d, e and f, the same images using the random mask are represented. The images of FIGS. 9d, e and f resemble to the original resolution target and prove the extended depth of focus, while in the images of FIGS. 9a, b and c, the contrast is lost due to the defocusing.

In FIG. 10, OTF charts produced in the same conditions than in FIG. 8 are represented. In FIG. 10 as well as in FIG. 9, the operation of the imaging system of the invention in which the random mask extends the depth of focus of the simulated imaging system is well represented. The OTF does not reach zeros and therefore deconvolution filtering restores the defocused information.

Following the results of FIG. 10, the PSF for the three simulated distances (with and without the random mask) were extracted from the optical design software, and the Wiener filters for the reconstruction process were calculated. Three filters were computed for the case when the random mask is used and three filters for the case of no random mask.

In FIG. 11, the cross filtering noises which are an important factor for the range estimation application were tested. The deconvolution filters for a specific distance over images containing objects at different distances were used, to make out that in such case no reconstruction is obtained. In FIG. 11a, the post processing result is represented for an object located at 50 mm and deconvolved by filter suited for 60 mm. In FIG. 11b, the post processing result is represented for an object located at 60 mm by filter suited for 50 mm. In FIG. 11c, the object is at 60 mm and the filter is suited for 70 mm, and in FIG. 11d the object is at 70 mm and the filter is for 60 mm. As expected indeed in all four cases, distorted reconstructions were obtained.

Reference is made to FIG. 12, in which the inventors have performed these experiments by fabricating a designed random mask. The test target was composed of three rosettes, at three aforementioned object distances. The images with and without the random mask were captured. In FIG. 12 the results of the deconvolution (Wiener inverse filtering) are represented with Wiener filters for objects distances of 50 mm, 60 mm, and 70 mm. In FIG. 12a the captured image using the random mask is represented. In FIG. 12b-d the images after the deconvolution with the corresponding inverse filters are represented (12b is for object at 50 mm, 12c is for distance of 60 mm and 12d is for 70 mm). In FIG. 12e the captured image is represented without using the random mask. In FIG. 12f-h the obtained images (for the case when there was no mask) are represented after deconvolution with the corresponding inverse filters. In FIG. 12i, the image is represented when all the positions of the objects are focused.

Figure 12A:
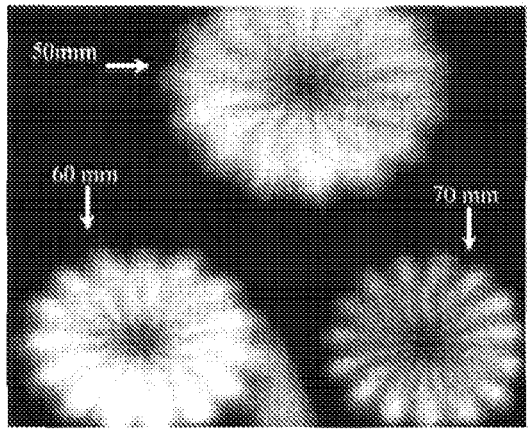
FIG. 12 illustrates the results of deconvolution with Wiener filters for distances of 50 mm, 60 mm, 70 mm; a represents a captured image with random mask; b-d Images after deconvolution with corresponding inverse filters; e represents a captured image without random mask; f-h represent images after deconvolution with corresponding inverse filters; i represents the image at focused position.
Figure 12E:
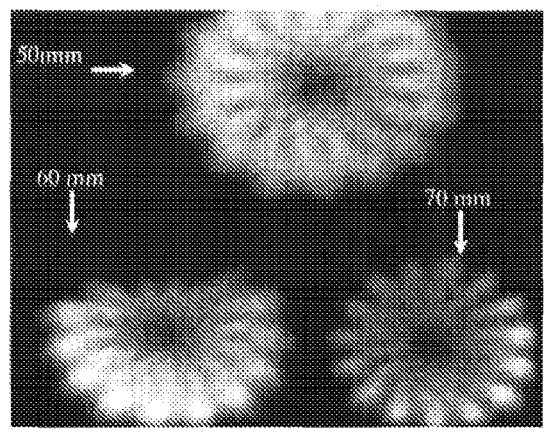
Figure 12B:
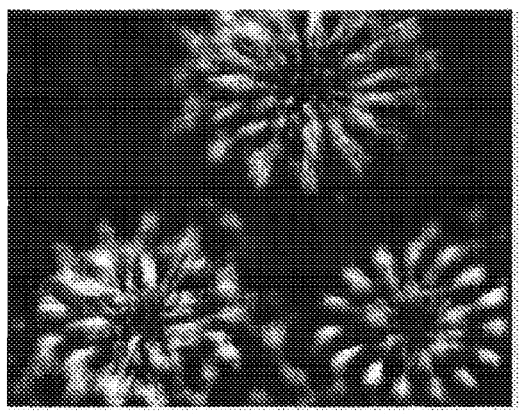
Figure 12F:
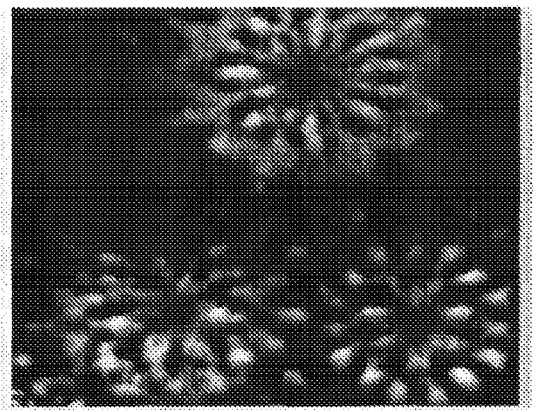
Figure 12C:
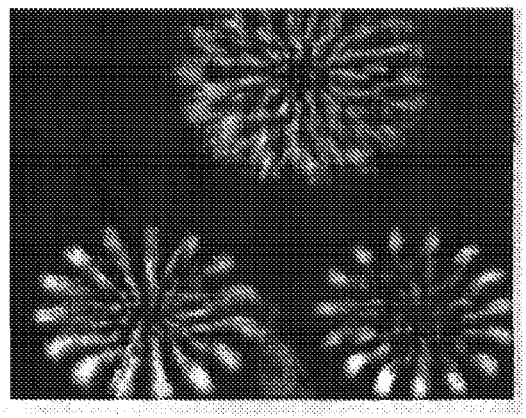
Figure 12G:
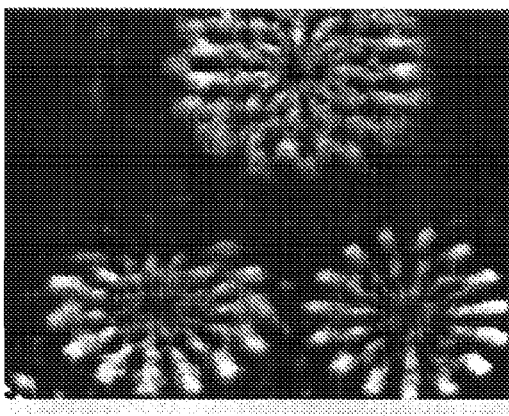
Figure 12D:
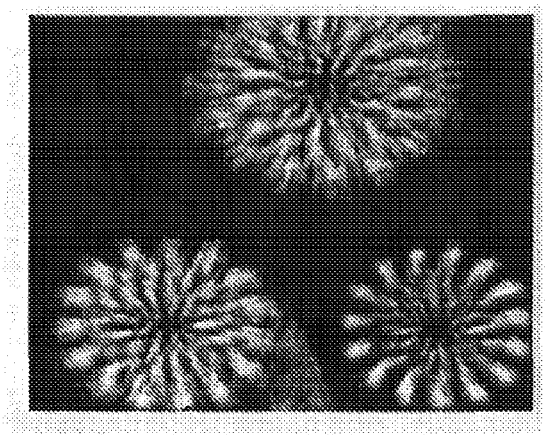
Figure 12H:
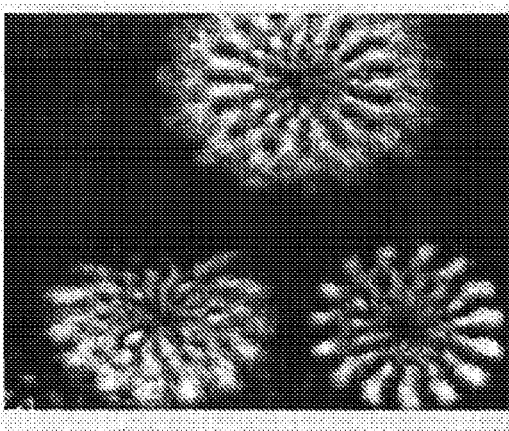
Figure 12I:
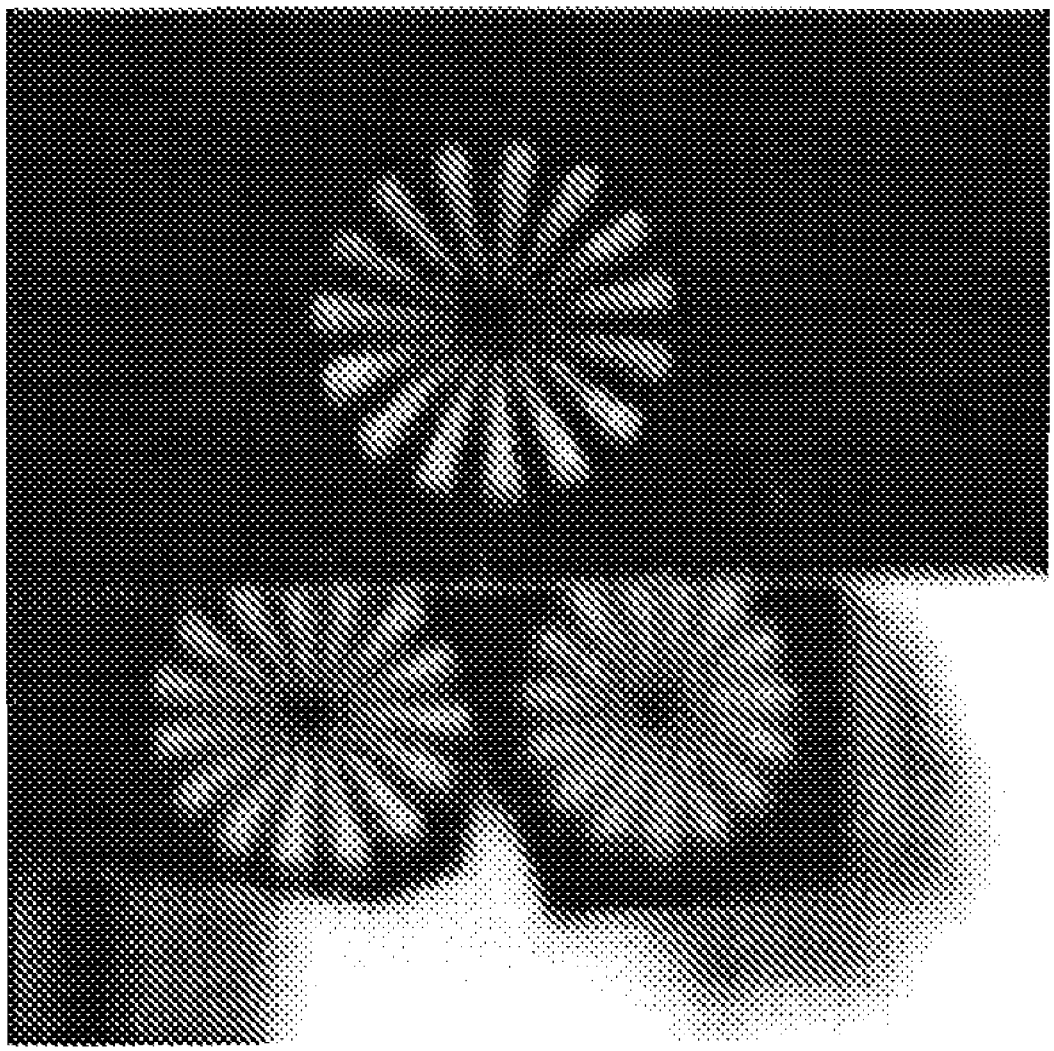

The usage of the random mask indeed allows range estimation since in the images of FIG. 12b-d in every image only one of the rosettes was reconstructed each time. Only the rosette whose distance corresponded to the applied Wiener filter was recovered properly (for each distance a different Wiener filter was computed).

In some embodiments, the random mask has a different random phase distribution for each wavelength corresponding to the red, green and blue spectra. By applying the technique of the present invention to three different color images (red, blue and green), desired range information and an extended depth of focus information can be extracted from these three different color images.

The invention claimed is:

1. An imaging system for imaging objects, the imaging system comprising an imaging lens arrangement, a light detector unit at a certain distance from the imaging lens arrangement, and a control unit connectable to the output of the detection unit; the imaging lens arrangement comprising an imaging lens and an optical element located in the vicinity of the lens aperture, said optical element introducing aperture coding by an array of regions differently affecting a phase of light incident thereon which are randomly distributed within the lens aperture, thereby generating an axially-dependent randomized phase distribution in the Optical Transfer Function (OTF) of the imaging system resulting in an extended depth of focus of the imaging system; said control unit being configured to decode the sampled output of the detection unit by using the random aperture coding to thereby extract 3D information of the objects in the field of view of the light detector unit.

2. The imaging system of claim 1, wherein the control unit is configured to provide a range estimation of the distance of different objects in the field of view of the detector.

3. The imaging system of claim 2, wherein the range estimation is provided by decoding the sampled output of the detection unit indicative of the data information of a single image.

4. The imaging system of claim 1, wherein said control unit is configured to provide an image resolution for at least a part of the field of view exceeding by a predetermined factor a geometrical resolution defined by the light detector unit.

5. The imaging system of claim 1, wherein the enhanced geometrical resolution is provided by decoding the sampled output of the detection unit indicative of the data information of a single image.

6. The imaging system of claim 1, wherein said optical element is configured to reduce a quadratic factor phase resulting from light getting out of focus of the imaging lens and maximize a defocused OTF of the imaging system by providing the out of focus OTF as much as possible away from zero.

7. The imaging system of claim 1, wherein said optical element is configured to configured to generate an orthogonal coding of the various spectral bands in the OTF plane prior to being aliased, enabling the recovering of the aliased information resulting in the re-separation and the reconstruction of the spectral bands, and the enhancement of the image resolution for at least a part of the object exceeding by a predetermined factor a geometrical resolution defined by the light detector unit.

8. The imaging system of claim 1, wherein said random phase aperture coding is positioned in the exit pupil plane of the imaging lens.

9. The imaging system of claim 1, wherein said random phase aperture coding is positioned in the entrance pupil plane of the imaging lens.

10. The imaging system of claim 1, wherein the imaging lens arrangement and the light detector unit are optically aligned and stationary mounted.

11. The imaging system of claim 1, wherein the optical element has a different random phase distribution for each wavelength corresponding to the red, green and blue spectra.

12. An imaging method comprising applying an aperture coding to an imaging lens, said aperture coding comprising affecting phase of light by randomly distributed different phase affecting regions within the lens aperture thereby generating an axially-dependent randomized phase in the Optical Transfer Function (OTF) distribution, resulting in an extended depth of focusing; and processing data indicative of an image of a region of interest to provide a linear correlation between the random phase distribution and each axial distance, and to extract 3D information on imaged objects in the region of interest from the linear correlation.

13. The method of claim 12, wherein extracting 3D information is obtained by multiplying the OTF with different random phase corresponding to different axial distance.

14. The method of claim 12, comprising optical processing of the light signal with a function coding, so as to provide orthogonality of spectral data indicative of a sampled output of a detector.

15. The method of claim 14, wherein the orthogonality of spectral data increases the geometrical resolution of the detector.

16. The method of claim 12, comprising applying a filtering to reduce the amount of noise.

* * * * *